United States Patent [19]
Hofmann et al.

[11] Patent Number: 6,112,066
[45] Date of Patent: Aug. 29, 2000

[54] MOBILE RADIO SET AND METHOD OF DETERMINING THE RECEPTION FIELD STRENGTH

[75] Inventors: Ludwig Hofmann, Ilmmünster; Bernhard Raaf, München, both of Germany

[73] Assignee: Siemens Aktiengesellschaft, Munich, Germany

[21] Appl. No.: 09/137,922

[22] Filed: Aug. 20, 1998

[30] Foreign Application Priority Data

Dec. 20, 1996 [DE] Germany .......................... 196 53 556

[51] Int. Cl.[7] ................................................. H04B 17/00
[52] U.S. Cl. ...................... 455/226.2; 455/62; 455/455; 370/347; 370/441; 370/337
[58] Field of Search ........................... 455/436, 437–444, 455/226.2, 513, 516, 525, 509, 62, 507, 39, 455; 370/252, 337, 347, 441, 321, 318

[56] References Cited

U.S. PATENT DOCUMENTS

| | | | |
|---|---|---|---|
| 4,365,347 | 12/1982 | Otsuka et al. | 455/179.1 |
| 5,027,352 | 6/1991 | Goode | 370/345 |
| 5,142,695 | 8/1992 | Roberts et al. | 455/450 |
| 5,303,262 | 4/1994 | Johnson | 375/224 |
| 5,390,365 | 2/1995 | Enoki et al. | 455/553 |
| 5,410,733 | 4/1995 | Niva et al. | 455/437 |
| 5,442,635 | 8/1995 | Persson | 370/347 |
| 5,475,877 | 12/1995 | Adachi | 455/343 |
| 5,479,410 | 12/1995 | Paavonen | 370/332 |
| 5,630,218 | 5/1997 | Muto | 455/226.2 |
| 5,729,539 | 3/1998 | Heeschen et al. | 370/332 |
| 5,970,105 | 10/1999 | Dacus | 375/344 |
| 5,995,498 | 11/1999 | Toot, Jr. et al. | 370/332 |
| 6,002,673 | 12/1999 | Kahn et al. | 370/252 |

*Primary Examiner*—Dwayne D. Bost
*Assistant Examiner*—Sonny Trinh
*Attorney, Agent, or Firm*—Herbert L. Lerner; Laurence A. Greenberg; Werner H. Stemer

[57] ABSTRACT

The reception field strength of the RF carriers of adjacent channels and of the current channel are determined in a mobile radio set in a TDMA system. A plurality of individual measurements are carried out for each RF carrier during a measurement time period, and a representative, determined value is formed from the corresponding individual measured values. A part of the time slot duration is chosen as the measurement interval for each individual measurement. The individual measurements are preferably offset with respect to the time frame.

12 Claims, 3 Drawing Sheets

MOBILE RADIO SET AND METHOD OF DETERMINING THE RECEPTION FIELD STRENGTH

CROSS-REFERENCE TO RELATED APPLICATION

This is a continuation of copending international application PCT/DE97/02517, filed Oct. 29, 1997, which designated the United States.

BACKGROUND OF THE INVENTION

Field of the Invention

The invention relates to a method for determining the reception field strength of the RF carriers of adjacent channels and of the current channel in mobile radio apparatus operated in a TDMA system (time-division multiple access system). A plurality of individual measurements are carried out for each RF carrier during a measurement time period, and a representative, determined value is formed from the corresponding individual measured values.

The invention also relates to a mobile radio set for operation in a TDMA system, having RF receiver and transmitter units controlled by a synthesizer, having modulator and demodulator units assigned to an AF unit, having a level measurement and storage unit, having a counter and having a time-dependent controller which is assigned to the synthesizer, to the RF sections, to the demodulator unit and to the level measurement and storage unit, having a frequency reference unit for the synthesizer, counter and time-dependent controller and for the modulator and demodulator units, and having a control logic device for controlling the level measurement and storage unit and other units, the control logic device and the counter being set up with the time-dependent controller and interacting with the RF receiving section, the demodulator and the level measurement and control unit for the purpose of measuring the levels of predetermined RF carriers repeatedly during a measurement time period and of forming a representative value from the determined individual measured values.

Modern mobile radio sets, such as those which operate using the GSM system, regularly have to measure the field strength at predetermined frequencies in order to allow problem-free handover to a new base station. For example, the GSM system uses 124 RF channels, of which the base station to the mobile radio set uses up to 32 RF channels, whose field strength must be checked. The field strengths of the six strongest carriers are always kept up to date in a memory.

The mobile radio set has to carry out a predetermined minimum number of field strength measurements, which should be carried out at times that are distributed as uniformly as possible. The determined measured values, in the GSM system generally five, are used to form a mean value, the intention of which is to avoid misinterpretations, for example as a result of short-term fading or temporary disconnections.

The field strength measurements are carried out during conversation as well as in the so-called idle mode. For this purpose, the base station always transmits at a predetermined frequency, the "C0" frequency in the GSM system, even if this is unnecessary for the actual signalling. Between two corresponding bursts of the TDMA system, the base station may also briefly transmit at a lower power, so that there are field strength reductions between successive bursts (also called "up/down ramping"). With regard to the required field strength measurement, reference is had, for example, to DRAFT pr ETS 300578, May 1995, ETSI (European Telecommunications Standard Institute). Measurement over the duration of a time slot is also based on the GSM Technical Specification, GSM 05.02, August 1996, Version 5.1.0 published by the ETSI. The field strength measurement for adjacent cells and the problems associated with this are also described in Section 4.1.4.3 of the book entitled "The GSM System", M. Mouly and Marie-B. Pautet, Palaiseau 1992.

According to the prior art, the field strength of each C0 channel is measured five times, in each case for the duration of a time slot. The measurement is thereby in general not carried out from the start to the end of a burst. Instead, as the measurement time lasts for the duration of one burst it covers part of one burst and part of the next burst. This is due to the fact that, although the time frames of the individual radio cells have the same burst duration, they are offset with respect to one another.

In the case of network-independent receivers and mobile radio sets, such as those which operate under the GSM Standard, particular value is placed on low power consumption in order to ensure operation for as long as possible with a battery or one accumulator charge, in particular standby operation. Attention is therefore being paid to not carrying out unrequired functions for as long as possible, in order to reduce the mean power consumption. In the case of devices which operate in a radio network using a time-division multiplex organization, a standby mode exists, also called standby operation or the idle mode. In this mode, all the unrequired function groups, for example, can be disconnected periodically from the power supply in order to reduce the mean energy requirement.

The power-consuming functions in the idle mode also include the measurement of the channel field strength. This, of course, disadvantageously reduces the operating duration of the mobile radio set that can be achieved with one accumulator charge.

SUMMARY OF THE INVENTION

It is accordingly an object of the invention to provide a mobile radio set and method of determining the reception field strength, which overcomes the above-mentioned disadvantages of the prior art devices and methods of this general type and which allows the power requirement to be reduced without decreasing the reliability of the measurement.

With the foregoing and other objects in view there is provided, in accordance with the invention, a method of determining a reception field strength of RF carriers of adjacent channels and of a current channel in a mobile radio set operated in a TDMA system, which comprises:

performing a plurality of individual measurements for each RF carrier during a defined measurement time period;

forming a representative value from the corresponding individual measured values; and choosing a part of a time slot duration as a measurement interval for each individual measurement.

In other words, the objects of the invention are satisfied in that a part of the time slot duration is chosen as the measurement interval for each individual measurement.

The invention results in a considerable savings in power consumption in both the analog and the digital receiving sections. If, for example, measurements are carried out only during one fifth of the duration of a time slot, then this leads essentially to a reduction in the power consumption for field strength measurements to 20% of the normal value. This accordingly achieves a longer operating duration, particularly in standby operation. The prior art system has thus been considerably improved with regard to the power consumption because those level measurements were unconditionally bound to the burst frame, in that the measurements would always be carried out over an entire time slot in the prior art.

It is particularly advantageous if the individual measurements are offset with respect to the time frame. In this way, incorrect measurements caused by disturbances or irregularities which always occur at the same point in a burst are avoided.

In accordance with an additional feature of the invention, the representative value is formed by averaging the individual measured values. Preferably, those individual measured values that lie below a predetermined level are dropped from the averaging process.

In accordance with another feature of the invention, the representative value is formed by determining a median value from the individual measured values. Alternatively, a peak value of the individual measured values may be determined.

In accordance with a further feature of the invention, a time profile of each individual measured value is compared with a stored, predetermined profile of an up/down ramping between successive bursts and, if an individual measured value corresponds with the predetermined profile, the measured value is accordingly corrected. This eliminates or reduces the undesireable effects of the so-called "up/down ramping".

In accordance with again an added feature of the invention, each measurement interval is divided into sub-intervals whose duration essentially corresponds to a duration of an up/down ramping between successive bursts, and a measured value is rejected from a sub-interval with the lowest value of all the measurement intervals included in the measurement. In accordance with a simplified alternative, a measured value from a sub-interval which has a lowest value in each measurement interval is rejected.

In accordance with again an additional feature of the invention, if a relative position of a time frame of an adjacent RF carrier is known, the measurement intervals are defined with respect to that time frame such that no measurement interval occurs at a time during up/down ramping. This option safely avoids any negative influence in the measurement of the up/down ramping.

In accordance with again a further feature of the invention, an integer fraction of a time slot duration is chosen as a measurement interval. Preferably, the measurement interval is between half and one sixth of a burst duration.

With the above and other objects in view there is also provided, in accordance with the invention, a mobile radio set for operation in a TDMA system, comprising:

an RF section including receiving and transmitting units;

a synthesizer connected to and controlling the RF receiving and transmitting units;

an AF section including a modulator unit and a demodulator unit;

a level measurement and storage unit connected to the AF section, the level measurement and storage unit including at least one memory and a calculation section;

a counter and a time-dependent controller connected to the synthesizer, to the the RF section, to the demodulator unit, and to the level measurement and storage unit;

a frequency reference unit connected to the synthesizer, to the counter and the time-dependent controller, and to the modulator and demodulator units; and a control logic connected to and controlling the level measurement and storage unit, the control logic and the counter, together with the time-dependent controller, and with the RF receiving section, the demodulator, and the level measurement and control unit, repeatedly measuring levels of predetermined RF carriers during a measurement time period and forming a representative value from individual measured values;

the time-dependent controller specifying to the level measurement and storage unit a portion of a TDMA time slot duration as a measurement interval for each individual measurement.

In other words, the above objects are satisfied with the time-dependent controller that specifies for the level measurement and storage unit a part of the TDMA time slot duration as the measurement interval for each individual measurement.

In accordance with yet an added feature of the invention, the time-dependent controller and the level measurement and storage unit are adapted to carry out successive individual measurements offset with respect to a time frame of the TDMA system.

In accordance with yet another feature of the invention, the calculation section forms the representative value from the individual measured values by averaging. Advantageous options of excluding certain measurements or of properly timing the measurements are indicated above with regard to the method.

In accordance with yet an additional feature of the invention, the time-dependent controller and the calculation section are adapted to split the measurement interval into sub-intervals having a duration essentially corresponding to a duration of an up/down ramping between successive bursts, and to reject the measured value of a sub-interval with a lowest value of all the measurement intervals involved in the measurement. In a simplified alternative, the measured value of a sub-interval with a lowest value in each measurement interval is rejected.

In accordance with another feature of the invention, the time-dependent controller, the control logic, and the level measurement and storage unit are adapted to detect a relative position of a time frame of an adjacent RF carrier and to set the measurement intervals with respect to the time frame such that no measurement interval occurs within a time period of an up/down ramping.

In accordance with a concomitant feature of the invention, the time-dependent controller is adapted to specify as the measurement interval an integer fraction of a time slot duration in the TDMA system. The integer fraction is between half and one sixth of the time slot duration.

Other features which are considered as characteristic for the invention are set forth in the appended claims.

Although the invention is illustrated and described herein as embodied in a mobile radio set and method for determining the reception field strength, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
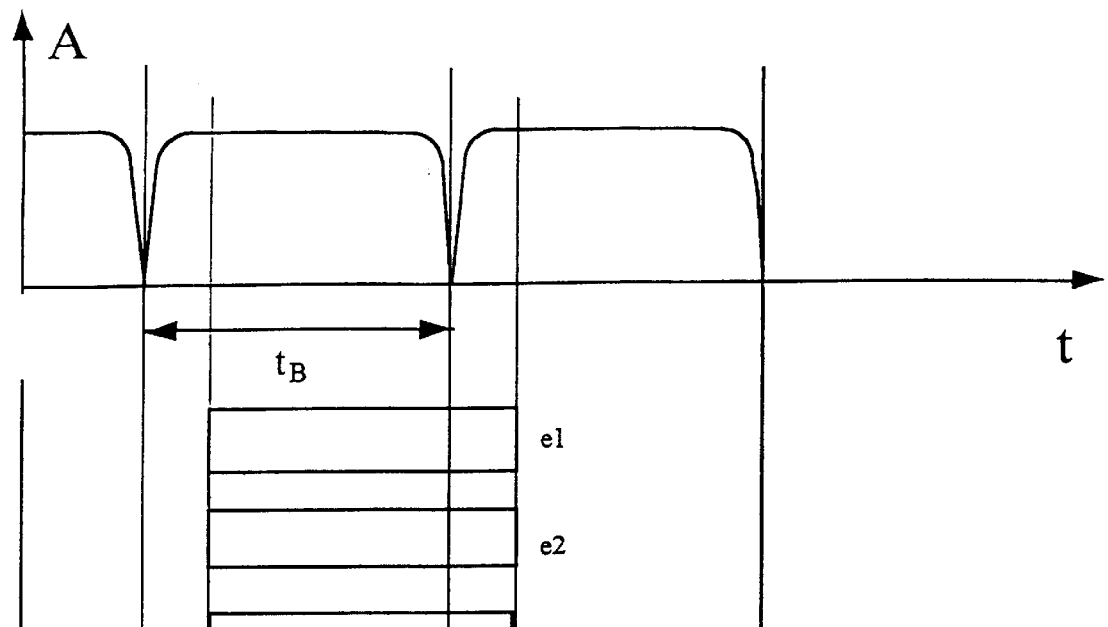
FIG. 1A and FIG. 1B are diagrams of the basic measurement methods according to the prior art and according to the invention, respectively.

Referring now to the figures of the drawing in detail and first, particularly, to FIG. 1a thereof, there is graphed a signal of successive bursts which each have a duration $t_B$ and arrive at the location of a mobile radio set with an amplitude A. This is based on a mobile radio system operating using a TDMA method (Time Division Multiple Access), such as, for example, the GSM system. In this system, the mobile radio set must regularly measure the field strength at pre-determined frequencies, as explained above. The burst duration $t_B$ is, for example, in the order of magnitude of 500 µs. In the prior art system (FIG. 1A), a plurality of measurements (in this case five) are carried out successively over the duration of a burst. The measurement result comprises five different amplitude values, which are illustrated in FIG. 1a as blocks "e1" to "e5" and which follow one another along a second time axis t'. These amplitudes or individual measured values are added and divided by five for averaging. The arithmetic mean is obtained as the representatively determined value r.

Figure 1B:
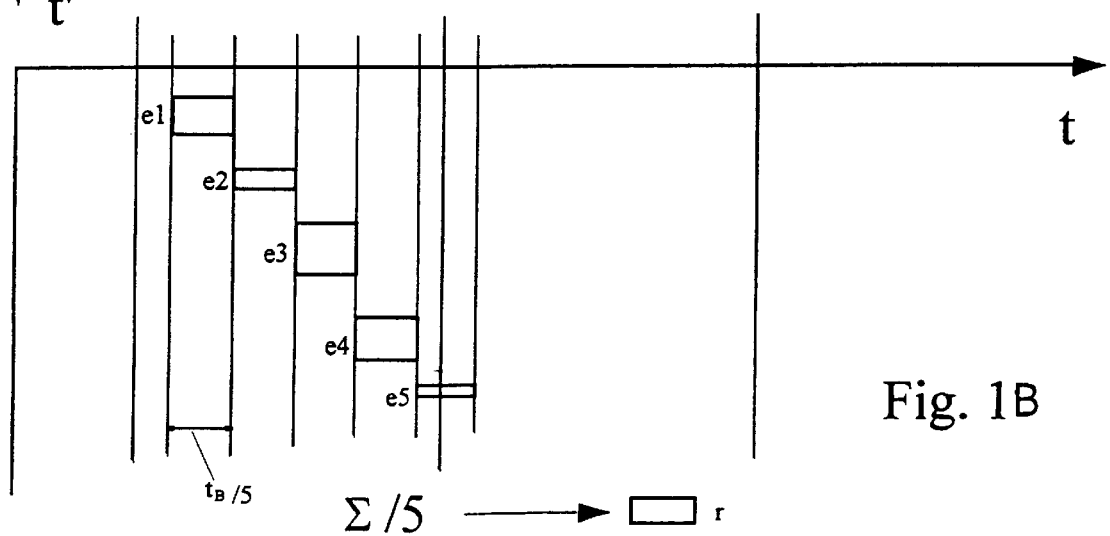

With reference to FIG. 1B, the invention provides for each individual measurement to be carried out over only a fraction of the time slot (=burst) duration, in the present case over $t_B/5$. A plurality of measurements, in this case five, are also carried out successively in the case of the invention, but expediently offset with respect to the time frame. This means that the individual measurements are carried out, for example, at intervals of $(t_B+t_B/5)$, or of multiples, $n*(t_B+t_B/5)$. The results of the individual measurements can also be averaged arithmetically. The measurements are not necessarily carried out during immediately successive bursts, but in general at very much greater intervals, for example of a second, corresponding to about 1600 bursts in the GSM system.

Figure 3:
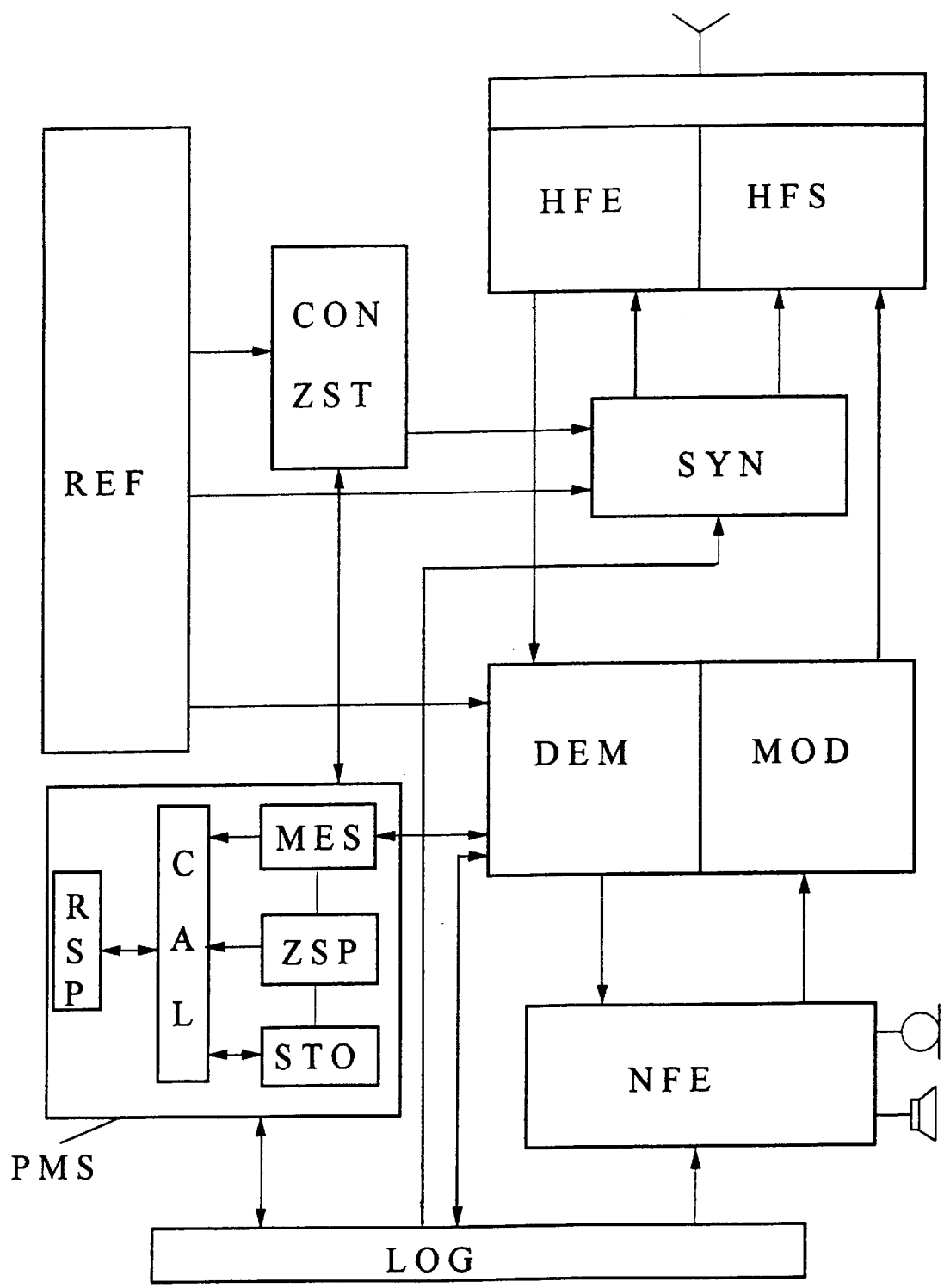
FIG. 3 is a block diagram of a mobile radio set according to the invention.

In order to explain the invention further, reference is now had to FIG. 3, which illustrates a simplified and exemplary block diagram of a mobile radio set according to the invention. The mobile radio set has an RF transmitting section HFS and an RF receiving section HFE, both RF sections being controlled in a conventional manner by a synthesizer SYN. A reference frequency unit REF supplies a reference signal, inter alia, to the synthesizer as well. The two RF sections HFS and HFE are assigned modulator and demodulator units MOD and DEM, which modulate and demodulate the signals of an AF unit NFE as well as all the other required signals, in particular data signals.

The mobile radio set furthermore has a level measurement and storage unit PMS, which is driven by a time-dependent controller ZST having a counter CON. The time-dependent controller ZST receives a reference signal from the reference frequency unit, and also supplies a control signal to the synthesizer SYN.

The level measurement and storage unit PMS which, for its part, can influence the time-dependent controller ZST, has as the essential function groups a measurement unit MES which receives level signals from the demodulator DEM, a buffer memory ZSP, a memory STO, a ramping memory RSP and a calculation section CAL. A control logic device LOG, for example a microcontroller, has the task of carrying out the management of most function blocks in the mobile radio set. The control logic device LOG can thus switch off unrequired function blocks and switch them on at a later time. The counter CON and the time-dependent controller ZST are also programmed by the control logic device LOG in order to switch the RF unit HFE, the demodulator DEM and the calculation section CAL on and off.

The arithmetic mean value, as mentioned above, from the results of, for example, five individual measurements can be formed easily by storing the values measured successively by the measurement unit MES in the buffer memory ZSP, and by using the calculation section CAL to process them. The calculated mean value can be stored in the memory STO in which—corresponding to the choice of monitor channels—there are always, for example, 32 up-to-date mean values of level measurements for 32 RF carriers.

It is evident that the division of the TDMA time frame, that is to say of the burst length $t_B$, into, say, five parts, and carrying out successive individual measurements, which are then offset by $(t_B+t_B/5)$ or else by $(n*(t_B+t_B/5))$, can be carried out by the counter CON and the time-dependent controller ZST together with the level measurement and memory unit PMS.

FIG. 2 shows once again, somewhat enlarged in comparison with FIG. 1, successive bursts of duration $t_B$ with "up/down ramping" occurring between the bursts. This indicates an amplitude drop which is permitted, for example, in the GSM system and occurs when the base station briefly transmits at reduced power between two bursts. The field strength reductions which result from this can lead in the level measurement to values which do not correspond to the actual conditions.

Figure 2:
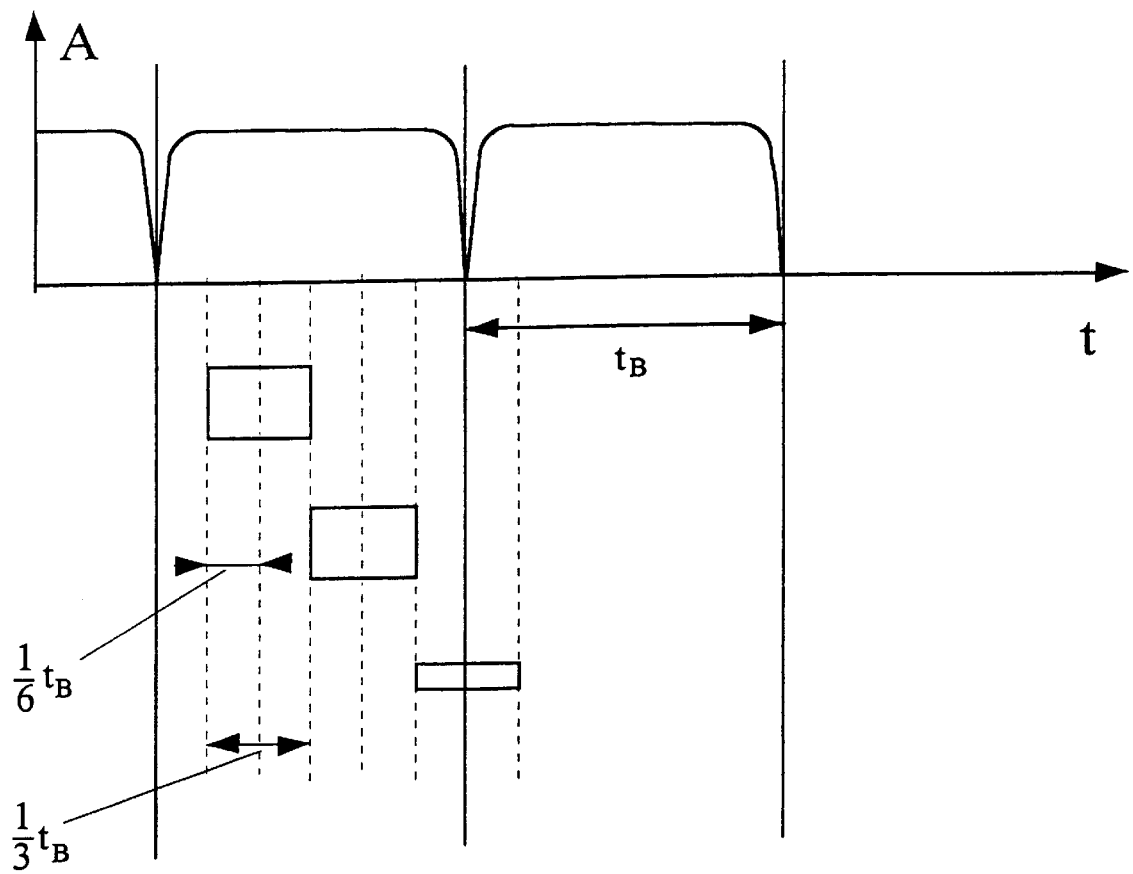
FIG. 2 is a diagram illustrating a further exemplary embodiment of the invention.
Figure 2:
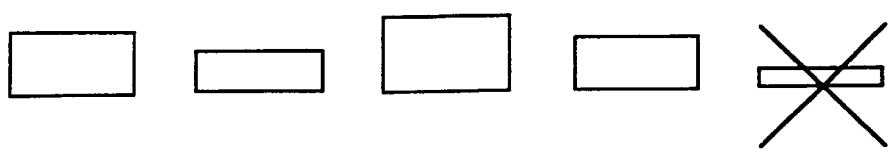

In order to achieve an improvement here, the measurement intervals $t_M$ can be split into sub-intervals—see FIG. 2—whose duration corresponds, for example, essentially to the duration $t_r$ of the up/down ramping. The individual measured value corresponding to the up/down ramping can then be rejected, i.e., excluded from the further processing such as averaging. In FIG. 2, the duration of a measurement interval is $t_M=t_B/3$ and the duration of a sub-interval is $t_M/2=t_B/6$. FIG. 2 shows, at the bottom, that the lowest of six individual measured values is then rejected.

It is possible to reject only the corresponding sub-intervals from all the measurement intervals involved in the measurement or, and this is simpler and in most cases equally adequate, to reject the corresponding sub-intervals in each measurement interval.

In principle, it is possible to exclude from the evaluation "stray values at the bottom", which occur, for example, as a result of temporary shadowing of the antenna of the mobile radio set caused by a moving vehicle. For example, the calculation section CAL can always exclude individual measured values below a pre-determined level, and this level can be defined relatively or absolutely.

However, the up/down ramping can also be considered without rejecting a measurement if, according to FIG. 3, a ramping memory RSP is provided in which the expected time profile of the up/down ramping is stored. The time profile of each individual measurement can now be compared, via the calculation section CAL, with the stored profile. If the comparison result is positive, the measured value is identified as being system-specific and—provided with a corresponding correction factor—is processed further. This is advantageous to the extent that there is no special desire with respect to the object of the invention, namely to save power, to reject measured values.

In some systems or devices, the relative position of the time frame of adjacent RF carriers is known. In these cases, the influence of the up/down ramping on the measurements can easily be overcome by shifting the measurement intervals such that no measurement interval whatsoever occurs in the time period of the up/down ramping, for example the measurement interval occurs precisely in the center of the burst. The relative position of an adjacent time frame may be known, for example, from previous measurements, in the GSM system by decoding the so-called "sync" burst.

The formation of an arithmetic mean value from the individual measured values in order to obtain a representative measured value of the level is, of course, in no way the only option for obtaining measured values of levels in practice. The level measurement and memory unit can, in fact, also be designed to form the representative value by determining a median value or by determining the peak value from the individual measured values.

In most cases, it is expedient for the time-dependent controller ZST and the counter CON to specify as measurement intervals an integer fraction of the time slot duration $t_B$. In practice, that fraction is between half and one sixth of the time slot duration.

We claim:

1. A method of determining a reception field strength of RF carriers of adjacent channels and of a current channel in a mobile radio set operated in a TDMA system, which comprises:

performing a plurality of individual measurements for each RF carrier during a defined measurement time period;

forming a representative value from the corresponding individual measured values; and choosing a part of a time slot duration as a measurement interval for each individual measurement.

2. The method according to claim 1, which comprises offsetting the individual measurements with respect to the time frame.

3. The method according to claim 1, wherein the forming step comprises forming the representative value by averaging the individual measured values.

4. The method according to claim 3, which comprises excluding individual measured values below a predetermined level from the averaging.

5. The method according to claim 1, wherein the forming step comprises forming the representative value by determining a median value from the individual measured values.

6. The method according to claim 1, wherein the forming step comprises determining a peak value of the individual measured values.

7. The method according to claim 1, which comprises comparing a time profile of each individual measured value with a stored, predetermined profile of an up/down ramping between successive bursts and, if an individual measured value corresponds with the predetermined profile, correcting the measured value.

8. The method according to claim 1, which comprises dividing each measurement interval into sub-intervals whose duration essentially corresponds to a duration of an up/down ramping between successive bursts, and rejecting a measured value from a sub-interval with the lowest value of all the measurement intervals included in the measurement.

9. The method according to claim 1, which comprises dividing each measurement interval into sub-intervals whose duration essentially corresponds to a duration of an up/down ramping between successive bursts, and rejecting a measured value from a sub-interval which has a lowest value in each measurement interval.

10. The method according to claim 1, wherein, if a relative position of a time frame of an adjacent RF carrier is known, defining the measurement intervals with respect to that time frame such that no measurement interval occurs at a time of an up/down ramping.

11. The method according to claim 1, which comprises choosing an integer fraction of a time slot duration as a measurement interval.

12. The method according to claim 11, which comprises defining the measurement interval to between half and one sixth of a burst duration.

* * * * *